United States Patent
Heo et al.

(10) Patent No.: US 9,397,414 B2
(45) Date of Patent: Jul. 19, 2016

(54) HOLE MOUNTING DEVICE OF PANEL FOR VEHICLE

(71) Applicants: Hyundai Motor Company, Seoul (KR); Kia Motors Corporation, Seoul (KR)

(72) Inventors: Chul Hee Heo, Anyang-si (KR); Hee Dae Oh, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/566,176

(22) Filed: Dec. 10, 2014

(65) Prior Publication Data
US 2016/0006141 A1 Jan. 7, 2016

(30) Foreign Application Priority Data
Jul. 1, 2014 (KR) .................. 10-2014-0082012

(51) Int. Cl.
*H01R 13/627* (2006.01)
*H01R 4/30* (2006.01)
*B60R 1/00* (2006.01)
*H01R 4/64* (2006.01)

(52) U.S. Cl.
CPC .... *H01R 4/305* (2013.01); *B60R 1/00* (2013.01); *H01R 4/302* (2013.01); *H01R 4/64* (2013.01); *H01R 2201/26* (2013.01)

(58) Field of Classification Search
CPC ........... H01R 4/30; H01R 4/64; H01R 4/302; H01R 4/305; H01R 9/0512; H01R 13/73; H01R 13/74; H01R 13/621; H01R 13/639; H01R 13/746; H01R 13/748; H01R 13/6215; H01R 13/6596; H01R 23/7021; H01R 2201/26; B60R 1/00

USPC .......... 439/359, 364, 544, 546, 551, 571, 573
See application file for complete search history.

(56) References Cited

U.S. PATENT DOCUMENTS

| 4,650,274 | A | * | 3/1987 | Schmid | ............ | H01R 4/64 439/801 |
| 4,873,763 | A | * | 10/1989 | Volonta | ............ | H01R 4/64 29/825 |
| 8,870,610 | B2 | * | 10/2014 | Tsuji | ............ | H01R 4/029 439/874 |

FOREIGN PATENT DOCUMENTS

| JP | 7-245515 A | 9/1995 |
| KR | 20-1998-016634 U | 6/1998 |
| KR | 1999-0033344 A | 5/1999 |
| KR | 10-0410755 B1 | 12/2003 |
| KR | 20-0338339 Y1 | 1/2004 |
| KR | 10-2004-0039688 A | 5/2004 |
| KR | 10-1025572 B1 | 3/2011 |

* cited by examiner

*Primary Examiner* — Neil Abrams
*Assistant Examiner* — Travis Chambers
(74) *Attorney, Agent, or Firm* — Morgan, Lewis & Bockius LLP

(57) ABSTRACT

A hole mounting device of a panel for a vehicle, may include a vehicle body panel provided with a plurality of holes, and a base disposed inside the vehicle body panel, wherein a first portion of the base is coupled to a first hole of the plurality of holes of the vehicle body panel, and a second portion of the base is fastened with a second hole of the plurality of holes of the vehicle body panel with a bolt, wherein an upper surface of the first portion in the base is provided with a protrusion and wherein the base includes a fastening part and the fastening part is provided with a circular welding protrusion.

4 Claims, 4 Drawing Sheets

HOLE MOUNTING DEVICE OF PANEL FOR VEHICLE

CROSS-REFERENCE TO RELATED APPLICATION

The present application claims priority to Korean Patent Application No. 10-2014-0082012, filed Jul. 1, 2014, the entire contents of which is incorporated herein for all purposes by this reference.

BACKGROUND OF THE INVENTION

1. Field of the Invention

The present disclosure relates to a hole mounting device of a panel for a vehicle, and more particularly, to a hole mounting device of a panel for a vehicle capable of improving working convenience at the time of coupling an earth terminal with a vehicle body panel and reducing the occurrence of a space of hole mounting.

2. Description of Related Art

Generally, in the case of a panel for a vehicle, a large number of holes for mounting parts are formed and thus there is a need to reduce the number of holes to improve Noise Vibration and Harshness (NVH) performance of the vehicle and improve the introduction of exhaust gas.

In particular, in the case of mounting an earth terminal (ground terminal) of a wiring or a curtain air bag, in addition to a mounting hole, a stopper hole to prevent a rotation at the time of mounting a bolt is additionally required.

As illustrated in FIG. 1, the hole mounting of the panel for a vehicle according to the related art disposes an earth terminal 20 on a panel 10 in a state in which the panel 10 is provided with a mounting hole 11 and a stopper hole 12 so as to insert an end of the earth terminal 20 into the stopper hole 12 of the panel 10 and a center of the earth terminal 20 may be provided with a through hole 21 to fasten the earth terminal with the mounting hole 11 of the panel 10 through a bolt B.

In this case, as illustrated in FIG. 2, a nut 13 is additionally disposed under the mounting hole 11 of the panel 10 to be able to improve a fastening force of the bolt B inserted in the mounting hole 11.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hole mounting device of a panel for a vehicle capable of improving working convenience at the time of coupling an earth terminal with a vehicle body panel and reducing the occurrence of a space of hole mounting.

According to various aspects of the present invention, a hole mounting device of a panel for a vehicle may include a vehicle body panel provided with a plurality of holes, and a base disposed inside the vehicle body panel, inserted into one hole of the plurality of holes of the vehicle body panel, and fastened with another hole of the plurality of holes of the vehicle body panel with a bolt.

The base may include a protrusion disposed at one end of an upper surface of the base to be inserted into the one hole of the plurality of holes of the vehicle body panel, and a fastening part disposed at another end of the upper surface of the base to be coupled with the bolt inserted into the other hole of the plurality of holes of the vehicle body panel.

The protrusion formed in the base may be provided in a cylindrical shape and the one hole of the plurality of holes of the vehicle body panel into which the protrusion is inserted may be provided in a circular shape corresponding to the protrusion.

The fastening part may include a fastening hole penetrately formed at the other end of the upper surface of the base, and a nut mounted on a lower surface of the base provided with the fastening hole.

The upper surface of the base provided with the protrusion and the fastening part may be provided with a welding protrusion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIGS. 3 to 7, a hole mounting device of a panel for a vehicle according to various embodiments of the present invention includes a vehicle body panel 10 provided with a plurality of holes and a base 100 disposed inside the vehicle body panel 10 and corresponding to the hole.

Figure 1:
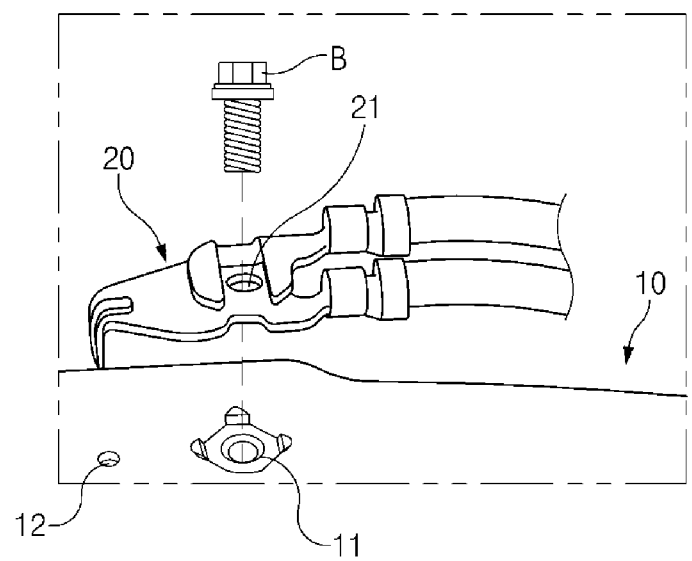
FIG. 1 is a view illustrating a hole mounting device of a panel for a vehicle according to the related art.
Figure 2:
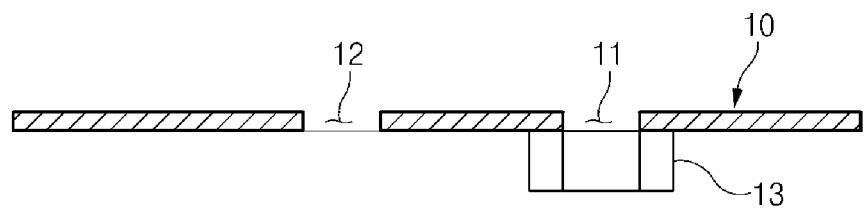
FIG. 2 is a cross-sectional view illustrating the hole mounting device of a panel for a vehicle according to the related art.
Figure 3:
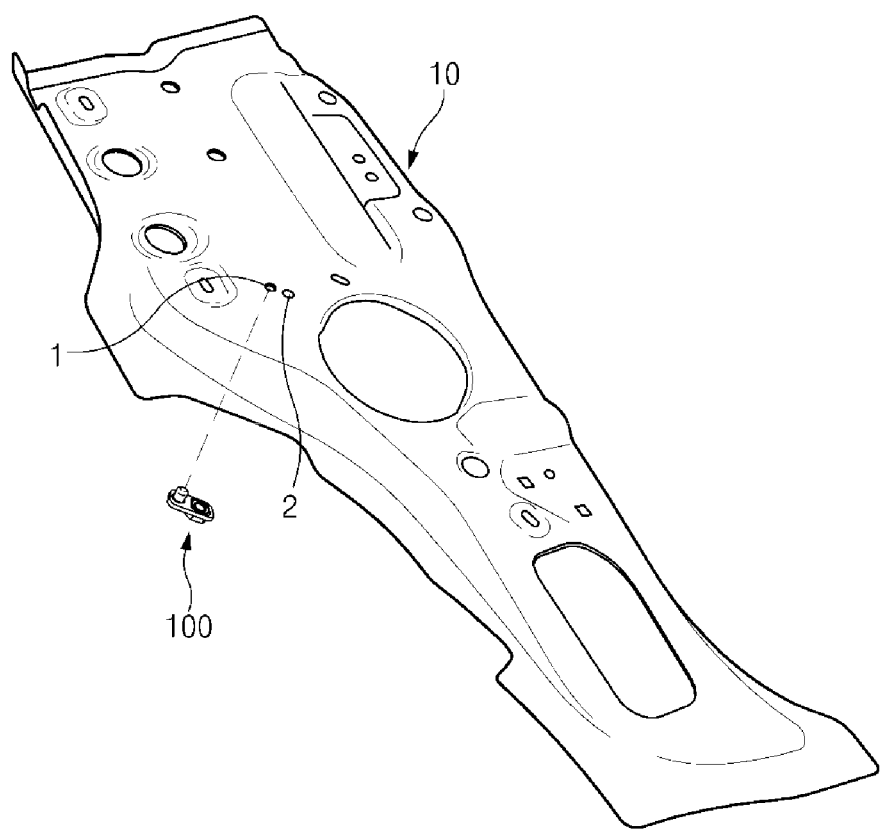
FIG. 3 is a view illustrating a base coupled to a vehicle body panel in an exemplary hole mounting device of a panel for the vehicle according to the present invention.
Figure 4:
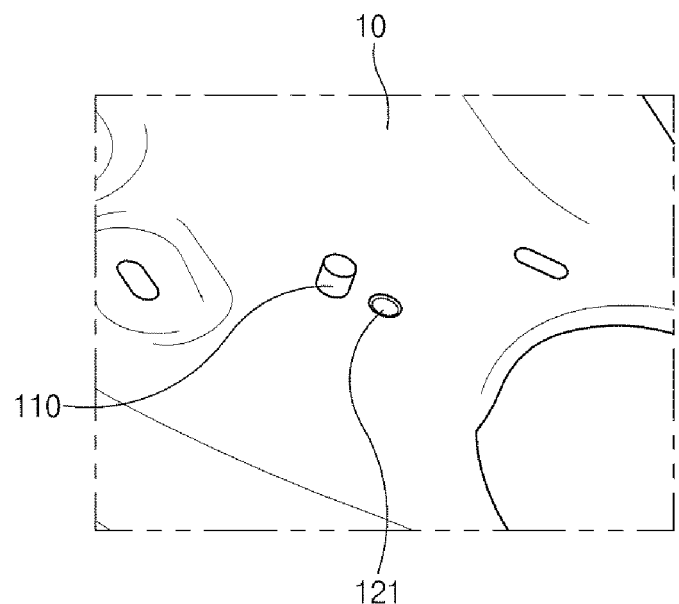
FIG. 4 is a view illustrating a state in which the base is coupled to the vehicle body panel in the exemplary hole mounting device of the panel for the vehicle according to the present invention.
Figure 5:
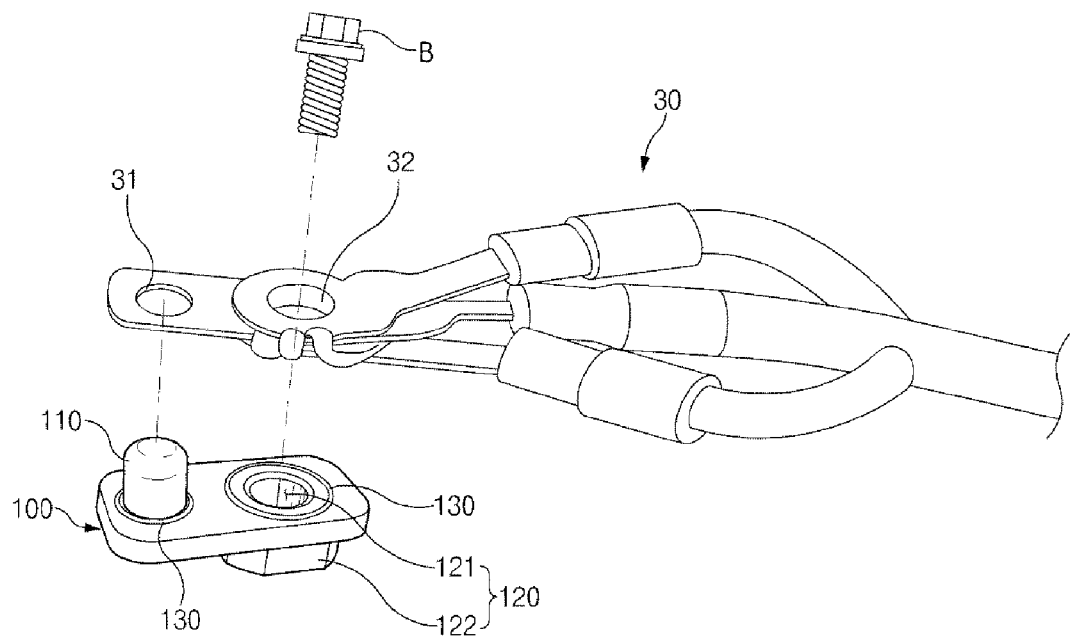
FIG. 5 is a view illustrating a state in which an earth terminal is coupled to the base of the exemplary hole mounting device of the panel for the vehicle according to the present invention.

As illustrated in FIGS. 3 and 4, the vehicle body panel 10 is provided with the plurality of holes 1 and 2 through which parts may be mounted.

In this case, the vehicle body panel 10 may be earthed to secure safety of an operator or accurately operate working equipment at the time of performing various kinds of working. To this end, the vehicle body panel 10 and the earth terminal 30 are mounted.

According to various embodiments of the present invention, when the vehicle body panel 10 and the earth terminal 30 are mounted, the vehicle body panel 10 is provided with the base 100 to reduce a space between holes formed in the vehicle body panel 10 and holes formed in the earth terminal 30.

Meanwhile, the plurality of holes formed in the vehicle body panel 10 include a first hole 1 and a second hole 2.

Figure 6:
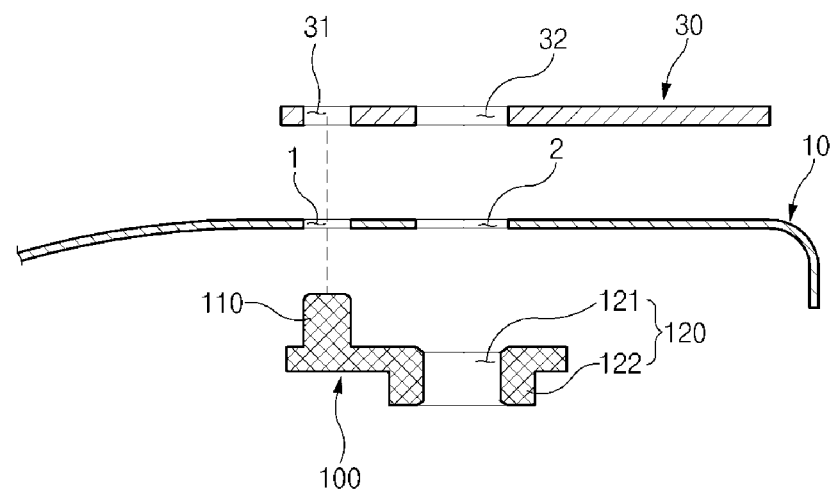
FIG. 6 is an exploded perspective view illustrating a state in which the vehicle body panel, the base, and the earth terminal are mounted in the exemplary hole mounting device of the panel for the vehicle according to the present invention.
Figure 7:
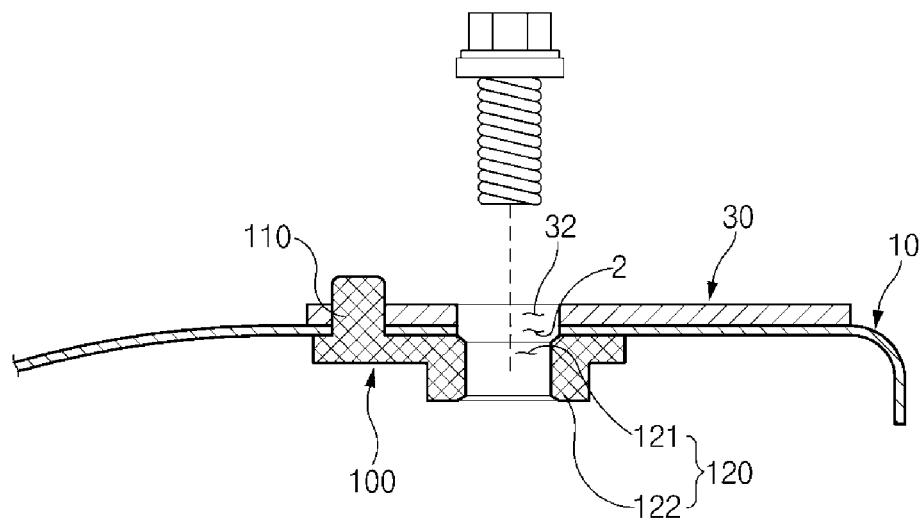
FIG. 7 is a view illustrating a state in which the vehicle body panel, the base, and the earth terminal are mounted in the exemplary hole mounting device of the panel for the vehicle according to the present invention.

As illustrated in FIGS. 6 and 7, the base 100 is basically disposed inside the vehicle body panel 10 and one end thereof is inserted into the first hole 1 of the vehicle body panel 10 and the other end thereof is fastened with the second hole 2 of the vehicle body panel 10 with a bolt B.

In this case, a protrusion 110 is protrudedly formed at one end of an upper surface of the base 100 and thus may be inserted into the first hole 1 of the vehicle body panel 10 and a fastening part 120 is formed at the other end of the upper surface thereof and thus may be mounted along with the bolt B inserted into the second hole 2 of the vehicle body panel 10.

In this configuration, the protrusion 110 formed in the base 100 is provided in a cylindrical shape, and as illustrated in FIG. 4, the first hole 1 of the vehicle body panel 10 into which the protrusion 110 is inserted is provided in a circular shape corresponding to an outer diameter of the protrusion 110 to prevent the space between the base 100 and the vehicle body panel 10 from occurring and as illustrated in FIGS. 6 and 7, the protrusion 110 penetrating through the first hole 1 may be inserted into a first through hole 31 formed in the earth terminal 30 to couple the base 100 with the vehicle body panel 10 and the earth terminal 30.

Meanwhile, the fastening part 120 is configured of a fastening hole 121 penetrately formed at the other end of the upper surface of the base 100 and a nut 122 integrally mounted on a lower surface of the other end of the base 100 provided with the fastening hole 121 and thus when the fastening part 120 is fastened with the bolt B inserted into the second hole 2 of the vehicle body panel 10, a separate nut 122 is disposed under the vehicle body panel 10 to solve a problem in that working convenience is degraded.

As the result, a second through hole 32 of the earth terminal 30 disposed on the vehicle body panel 10, the second hole 2 of the vehicle body panel 10, and the nut 122 of the base 100 are mounted through the bolt B.

Further, the upper surface of the base 100 on which the protrusion 110 and the fastening part 120 are formed is provided with a welding protrusion 130 to weld between the base 100 and the vehicle body panel 10 when the base 100 is coupled with the vehicle body panel 10, thereby preventing noise and exhaust gas from being introduced into a micro gap between the base 100 and the vehicle body panel 10.

As such, the present invention includes the vehicle body panel 10 provided with the plurality of holes and the base 100 of which one end is inserted into the first hole 1 of the vehicle body panel 10 and the other end is fastened with another hole of the vehicle body panel 10 with the bolt B, such that one end of the earth terminal is inserted through one base 100 and the other end thereof is fastened with the bolt B, thereby improving the working convenience, reducing the occurrence of the space of the hole mounting to improve the NVH performance of the vehicle and prevent the exhaust gas of the vehicle from being introduced into the vehicle interior, and minimizing the number of parts to remove the factors of rise in costs so as to improve the marketability.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hole mounting device of a panel for a vehicle, comprising:
    a vehicle body panel provided with a plurality of holes; and
    a base disposed inside the vehicle body panel, wherein a first portion of the base is coupled to a first hole of the plurality of holes of the vehicle body panel, and a second portion of the base is fastened with a second hole of the plurality of holes of the vehicle body panel with a bolt,
    wherein an upper surface of the first portion in the base is provided with a protrusion and
    wherein the base includes a fastening part and the fastening part is provided with a circular welding protrusion.

2. The hole mounting device according to claim 1,
    wherein the protrusion disposed at the upper surface of the base is inserted into the first hole of the plurality of holes of the vehicle body panel; and
    wherein the fastening part disposed at the second portion of the base is coupled with the bolt inserted into the second hole of the plurality of holes of the vehicle body panel.

3. The hole mounting device according to claim 2,
    wherein the protrusion formed in the base is provided in a cylindrical shape and wherein the first hole of the plurality of holes of the vehicle body panel into which the protrusion is inserted is provided in a circular shape corresponding to the protrusion.

4. The hole mounting device according to claim 2, wherein the fastening part includes:
a fastening hole penetrately formed at the second portion of the base; and
a nut mounted on a lower surface of the base provided with the fastening hole.

* * * * *